INVENTOR.
SHOICHI MIYASHIRO
BY Stephen H. Frishauf
Atty

PREPARATORY OPERATION OF THE SECOND TARGET

WRITING OPERATION ON THE TARGET

PREPARATORY OPERATION OF THE FIRST TARGET

WRITING OPERATION ON THE FIRST TARGET

REPRODUCTION OF REMOTE IMAGE & TRANSMISSION OF THE IMAGE IN NEAR STATION
READ OUT 3,385,995

ELECTRON TUBE DEVICES FOR IMAGE TRANSMISSION AND RECEPTION

Shoichi Miyashiro, Yokohama-shi, Japan, assignor to Tokyo Shibaura Electric Co., Ltd., Kawasaki-shi, Japan, a corporation of Japan Filed May 23, 1966, Ser. No. 552,205
Claims priority, application Japan, May 25, 1965, 40/30,418
10 Claims. (Cl. 315—12)

ABSTRACT OF THE DISCLOSURE

An optical image projected upon the photoelectric surface and an electrostatic charge image corresponding to an electric image signal applied to the electron gun are respectively stored on two storage targets, and after preserving these stored images for any desired interval of time, they can be reproduced by electrons, respectively emitted from the electron gun and the photoelectric surface to reproduce the image or the image current.

The present invention relates to an improved electron tube device for image transmission and reception and more particularly to an electron tube including a storage target of duplicated construction associated with a photoelectric surface and, an electron gun and a fluorescent screen and suitable for use in communication systems like video-telephones, for example.

An electron tube device having a single storage target has been utilized for image transmission and reception, but has not been entirely satisfactory.

It is an object of this invention to improve the characteristics of electron tubes for image transmission and reception.

A further object of this invention is to provide a novel electron tube which can store and reproduce two images.

A still further object of this invention is to provide an improved electron tube device which is especially suitable for use in video-telephone systems.

This invention can be more fully understood from the following detailed explanation when taken in connection with the accompanying drawings, in which.

Figures 4A, 4B, 4C:
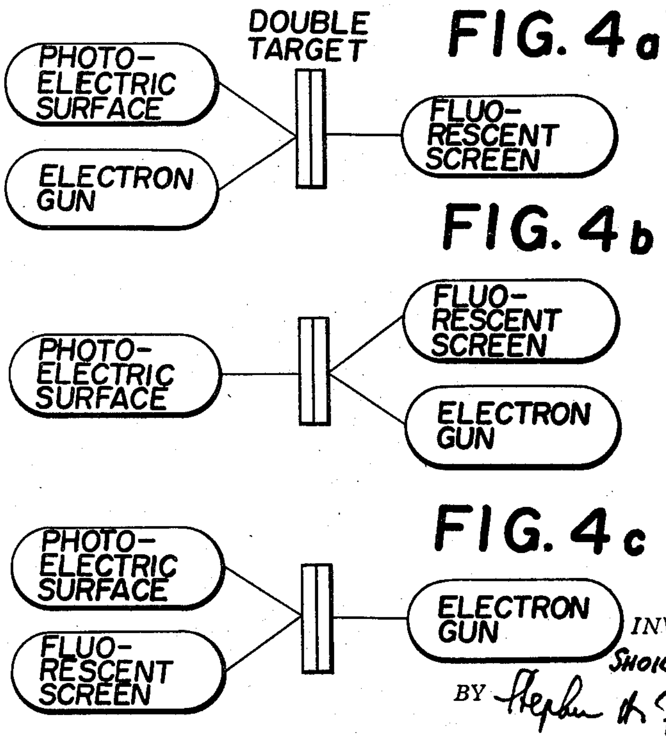
Figure 6:
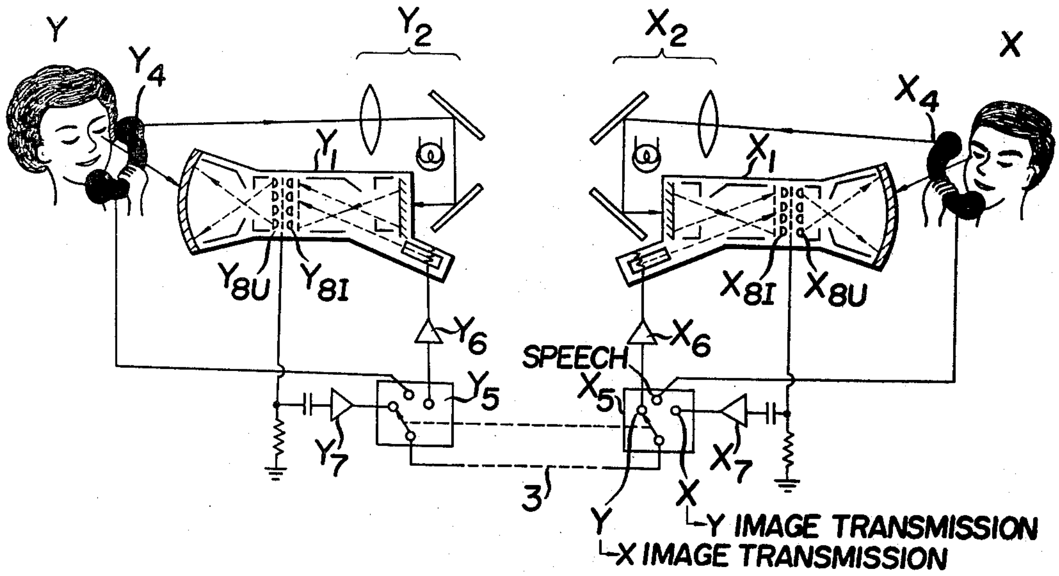
Figures 5A, 5B, 5C, 5D:
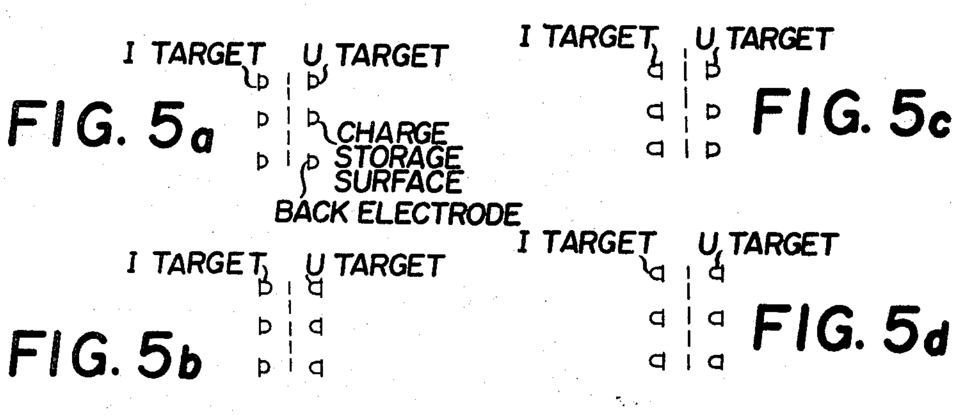
Figure 7:
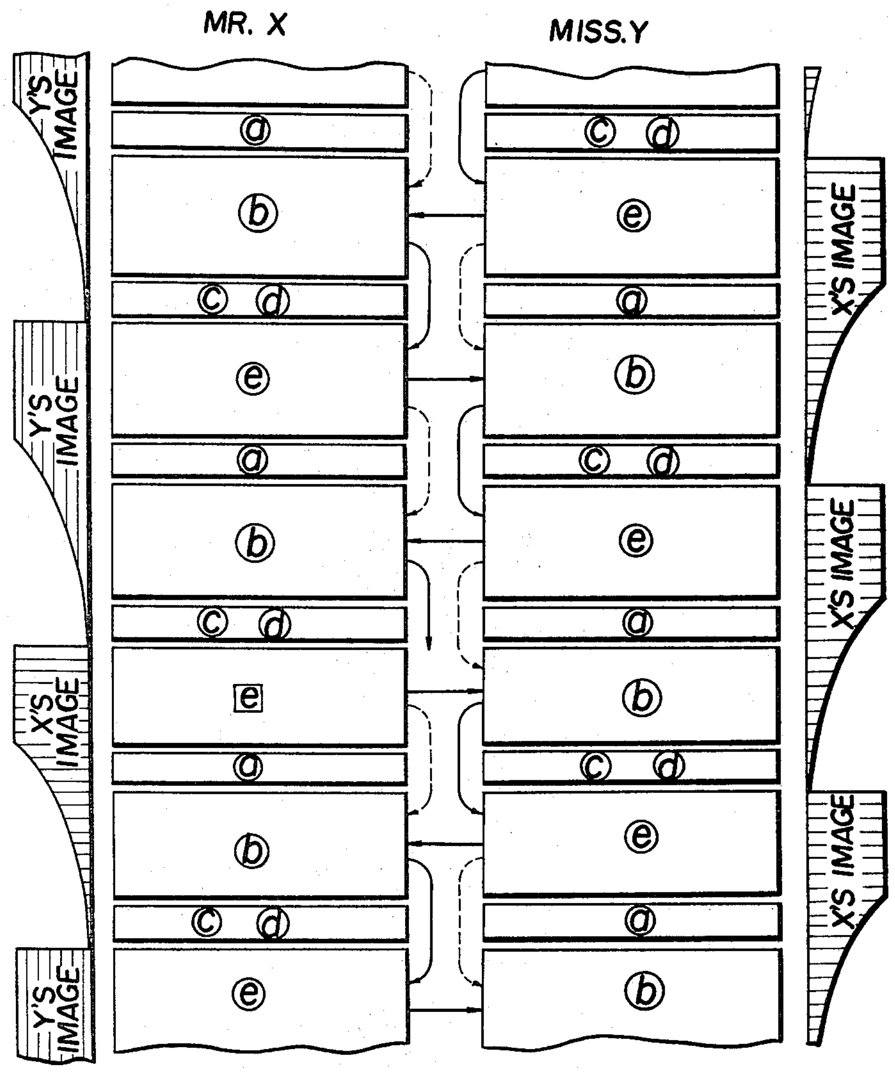
Figure 8:
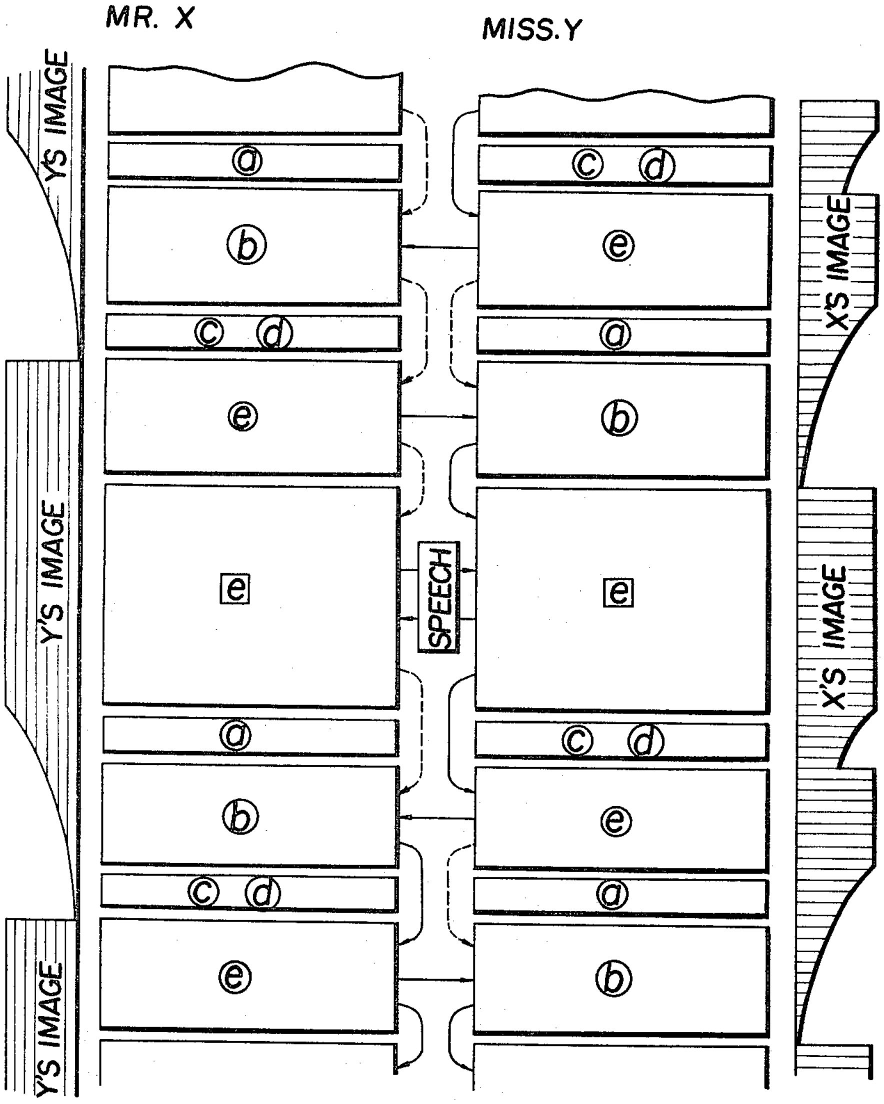

FIGS. 3*a* to 3*e* inclusive are schematic views to explain various phases of the fundamental operation of the electron tube device of this invention;

FIGS. 4*a* to 4*c* are views to erplain various manners of combining a photoelectric surface, an electron gun and a fluorescent screen with the double target of this invention;

FIGS. 5*a* to 5*d* inclusive are schematic views of various methods of arranging the double storage target of this invention;

FIG. 6 shows a circuit arrangement of one example of a video-telephone system in which the tubes of this invention are installed at the sending and receiving stations; and FIGS. 7 and 8 are charts to explain the operation programs of the communicating system of the video-telephone system shown in FIG. 6.

Figures 1, 2:
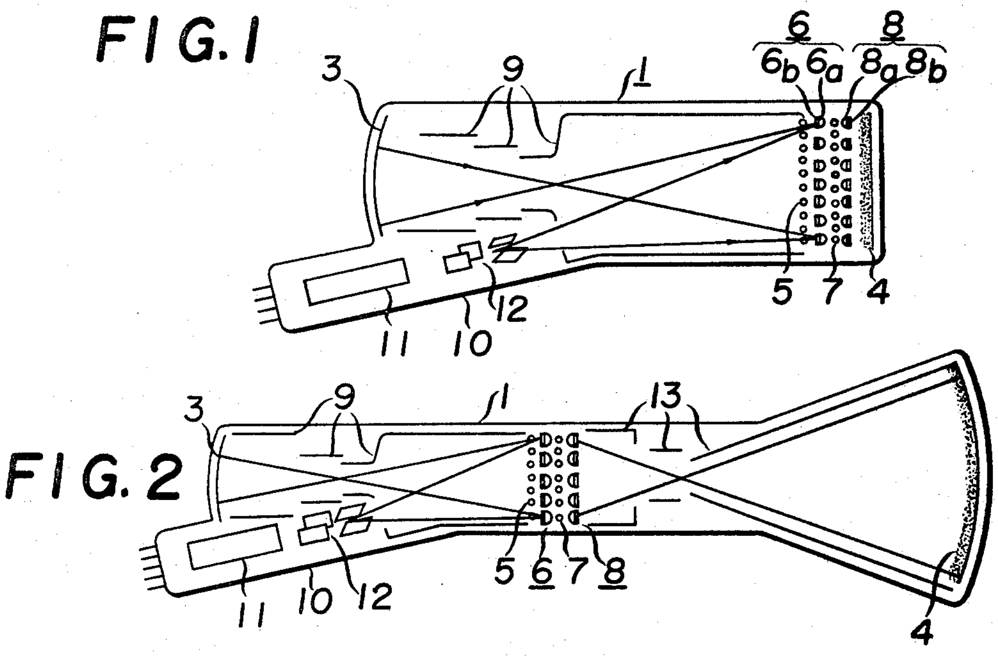
FIG. 1 is a schematic longitudinal section of one embodiment of a double target type electron tube device embodying the principle of this invention.
FIG. 2 is a similar view of another example of this invention.

Referring now to FIG. 1 of the accompanying drawings, the illustrated double target type electron tube device embodying this invention and adapted to transmit and receive images, comprises an evacuated envelope 1, a photoelectric surface 3 on the inner surface of one end glass surface thereof, a fluorescent screen 4 on the inner surface of the opposite end, a group of focussing electrodes 9, and a first mesh electrode 5, a first storage target electrode 6, a second mesh electrode 7 and a second storage target electrode 8 which are positioned relatively close to the fluorescent screen 4 and are arranged in parallel. An obliquely projecting arm 10 branches from evacuated envelope 1 near the photoelectric surface 3, in which are positioned an electron gun 11 and a deflector 12. Although not shown in the drawing, suitable lead wires are lead out of the tube from respective electrodes.

Storage targets 6 and 8 are constructed such that they have charge storage layers *6a* and *8a* which are formed by vapor depositing an insulating material such as calcium fluoride to a thickness of about several microns on the surfaces of metal screens *6b* and *8b* which serve as back electrodes and having a mesh size of about 750 meshes per inch, for example. Alternatively, the storage targets may be formed by vapor depositing a metal on one side of screens of insulators, such as glass meshes having a suitable thickness. The storage surfaces *6a* and *8a* of the first and second targets 6 and 8 are disposed to oppose each other. Although not shown in the drawing the electron gun 11 is provided with a control grid adapted to modulate the current by means of an image signal.

The fluorescent screen is provided with a so-called aluminum pack. Another grid mesh electrode may be mounted directly in front of the photoelectric surface for the purpose of preventing radiation of photoelectrons emitting from the photoelectric surface. While in FIG. 1 focussing and deflection of electron current emitted from the electron gun 11 and of the photoelectrons emitted from the photoelectric surface 3 are shown to be effected by electrostatic means it is to be understood that such focussing or deflection can also be made by electromagnetic means.

The operation of the electron tube shown in FIG. 1 is as follows: There are two means, i.e. the photoelectric surface and the electron gun for storing or writing electrostatic charges on a pair of storage targets 6 and 8. Also the stored images can be reproduced as electric image signals or as images on the fluorescent screen. Therefore, there may be considered various combinations of these, but the operation of the tube where it is used in a video-telephone system will be considered hereunder.

FIG. 3 illustrates the operation of the system when an image in one office is projected upon the photoelectric surface to send it to a remote station, and an image signal from the remote station is applied to the electron gun of the same tube to reproduce it on the fluorescent screen. The numerical values applied voltages utilized in the following description are shown only for the purpose of illustration and this invention is not limited thereto.

(a) The preparatory operation for writing signals on the second target.

The preparatory operation to cause the potential of the storage surface *8a* of the second target 8 which is located remote from the source of electrons to assume a certain uniform potential whereby to prepare for the storage of image signals will now be considered.

In this example this preparatory operation is effected in two steps, that is, erase and preparation.

At first, the storage surface *8a* is scanned by a flood light photoelectric current which is produced by illuminating the photoelectric surface 3 which is maintained at zero volt with flood light, at such a speed to assure a ratio of secondary electron emission of more than unity. For example, as shown in FIG. 3, if the first mesh electrode 5 were maintained at 300 v. the back electrode *6b* of the second target 6 at 340 v., the second mesh electrode 7 at 300 v., and the back electrode *8b* of the second target 8 at 340 v., then the storage surface *8a* would emit secondary electrons to have an averaged voltage at a slightly lower value, for example 335 v., thus promptly erasing an old electrostatic image that has been stored until that time.

In the next preparatory step, the potential difference between the storage surface *7a* and the back electrode *8b* is brought to a value required for the subsequent writing operation. Thus, without changing the potentials of other electrodes, if the potential of the back electrode *8b* is changed to +15 v., the potential of the storage surface *7a* would be changed to +10 v. by the action of capacitance coupling. Then upon impingement of the flood light electron current, the potential of the storage surface *8a* will assume a value substantially equal to that of the photoelectric surface 3, or a stabilized value near 0 v., thus completing the preparation of writing, since, as appears from the relative voltages, the ratio of electron emission is now less than unity.

(b) Writing operation of signals on the second target. An image can be stored on the second target 8 which can be subsequently reproduced on the fluorescent screen 4 as the optical image. While such an image may be an image which had been projected upon the photoelectric surface 3 and then transformed into photoelectrons, a writing operation by an electron beam emitted from the electric gun which has been modulated by an image signal transmitted from outside will be considered hereunder.

Figure 3A:
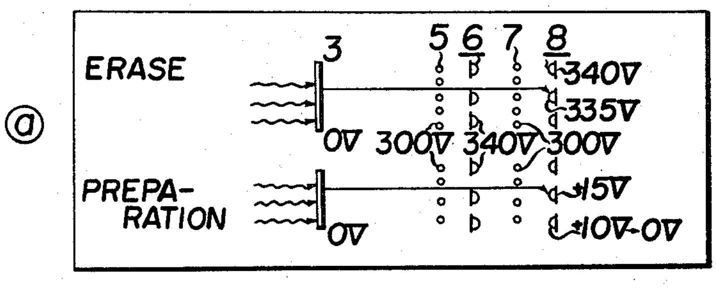
Figure 3B:
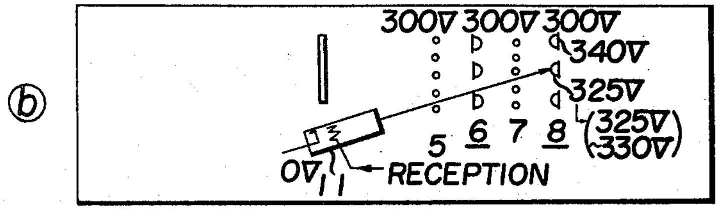
Figure 3C:
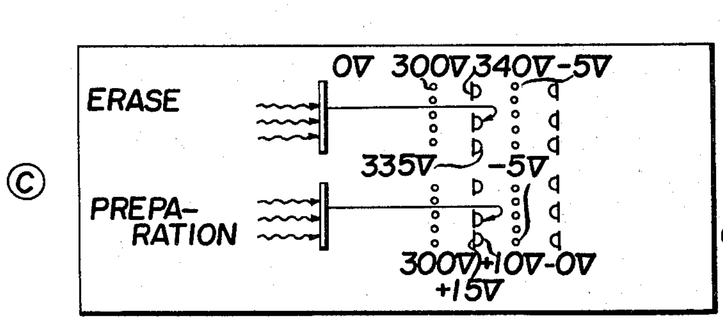
Figure 3D:
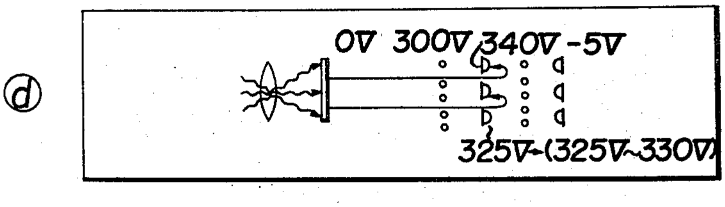
Figure 3E:
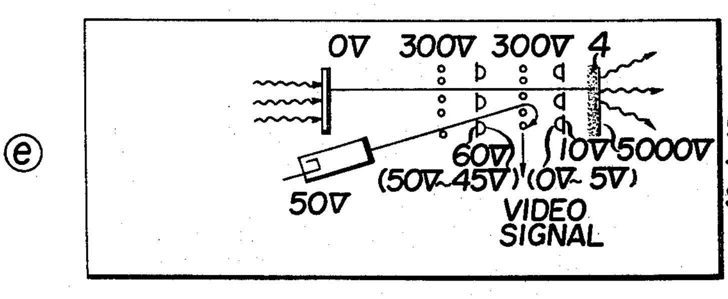

As shown in FIG. 3*b*, the image signal is applied to the control grid, while maintaining the cathode electrode of the electron gun 11 at 0 v., to cause it to emit a modulated electron beam. The first mesh electrode 5, the back electrode *6b* of the first target, and the second mesh electrode 7 are maintained at a potential of 300 v. while the back electrode *8b* of the second target 34 v. As the result of the preliminary operation since the back electrode of the second target was amde to have a potential lower than that of the back electrode *8b* by 15 v. it will have a potential of 325 v. When this target is scanned by the electron beam, the surface thereof will have a positive surface potential, and by adjusting the beam such that portions of the surface corresponding to the brightest portion will have a potential of approximately 330 v., then an electrostatic charge image of from 325 to 330 v. will be stored on the surface.

(c) The preparatory operation for writing signals on the first target.

By applying zero volt to the photoelectric surface 3, 300 v. to the first mesh electrode 5, 340 v. to the back electrode *5b* of the first target, and −5 v. to the second mesh electrode 7, the flood light electron current produced by illuminating the photoelectric surface with flood light can not pass through the second mesh electrode 7 and is repelled back from a point in front of the electrode. Thus, the second target 8 which is located behind the second mesh electrode 7 will not be affected in any way. In this way, under the condition wherein the ratio of secondary electron emission is larger than unity, the storage surface *6a* of the first target will have an average voltage of 335 v., thus quickly erasing any old electrostatic charge image which has been stored until that time. During the next preparatory stage the back electrode *6b* is switched to +15 v., while maintaining potentials of other electrodes unchanged, whereby the potential of the storage surface *6a* will be decreased to 10 v. by capacitive coupling. If the flood light electron current is caused to impinge upon the storage surface *6a* under this condition, the potential thereof would be reduced to a value which is substantially the same as that of the photoelectric surface 3, or 0 v., and would be stabilized at that value, thus completing the operation preparatory to writing, since the ratio of secondary electron emission is less than unity.

(d) Writing operation of signals on the first target. The writing operation, that is application of signals on the first target, is effected by the image current. A potential of 340 v. is applied to the back electrode *6b* of the first target (which is prepared for writing); the potential of the storage surface *6a* is then 325 v. An image is projected on the photoelectric surface 3. The image current which is produced by the image on the photoelectric surface 3, which is maintained at 0 v. is applied to and focussed on the first target 6 by means of a group of focussing electrodes 9, shown in FIG. 1. The second mesh electrode 7 is maintained at −5 v.; the photoelectrons will be returned back to the storage surface *6a* of the first target, thus causing no effect upon the second target 8. The intensity of illumination is adjusted such that portions corresponding to bright portions of the image will have a potential of 330 v. so that an electrostatic charge image of from 325 to 330 v. will be formed on the storage surface *6a*.

(e) Read-out operation.

The read-out operation wherein the image in the remote station is reproduced as an optical image, and the image in the rear station is read out as an image signal, which is the outstanding feature of this invention will be made hereunder.

As a first electron source, the photoelectric surface 3 will be maintained at zero potential and illuminated with flood light to emit a flood light electron current. As a second electron source the electron gun 11 is operated to emit a non-modulated scanning electron beam while maintaining its cathode at +50 v. The first and second mesh electrodes 5 and 7 are maintained at a potential of 300 v., the back electrode *6b* of the first target at +60 v. and the back electrode *8b* of the second electrode at +10 v. Then the electron beam emitted from the electron gun will be modulated by the electrostatic charge image on the first target thus deriving the image signal current of the image 26 in the near station from the second mesh electrode 7. This modulated image signal current can be transmitted to the far station. This scanning step will not interfere with the image stored on target 8, because the beam will be repelled back by the second target 8 which is maintained at a lower potential than the cathode of the electron gun, thus causing no effect upon the image from the remote station, stored on target 8. However, the flood light electron current will be modulated by the second target 8. This electron current is permitted to impinge upon the fluorescent screen maintained at 5 kv., and the image transmitted from the remote station, and placed on target 8 (step (b) above) be reproduced.

The above description refers to simultaneous operation of the two operations, it is to be understood that either one of them may be effected separately, if desired.

As can be noted from the foregoing description, with the novel electron tube device, an optical image projected upon the photoelectric surface and an electrostatic charge image corresponding to an electric image signal applied to the electron gun are respectively stored on two storage targets, and after preserving these stored images for any desired interval of time, they can be reproduced by electrons, respectively emitted from the electron gun and the photoelectric surface to reproduce the image or the image current. It is particularly noted that it is the feature of this invention that two types of charge images stored on two targets can be independently derived for image reproduction and as the image signal.

FIG. 2 shows another embodiment of this invention which is different from that shown in FIG. 1 in that an electron lens 13 is provided between the storage targets 6 and 8 and the fluorescent screen 4 so that the image electron current transmitted through the storage targets may be projected upon the fluorescent screen as an magnified image which is easier to view.

There are three ways of combining two superposed storage targets, two electron sources (i.e. the photoelectric surface and the electron gun) and the fluorescent screen, as diagrammatically shown in FIG. 4. Since each storage target has front and back surfaces there are four methods of superposing these two targets, as shown in FIGS. *5a* to *5d*; in which the target storing the remote image is referred to as the U-target, and that storing the near image, as the I-target. More particularly, in the arrangement shown in FIG. *5a*, the charge storage surfaces of the first and second targets are directed towards right, in FIG. *5b* the charge storage surfaces are opposing each other, in FIG. *5c*, the charge storage surfaces are directed oppositely and in FIG. *5d*, they are directed towards left. Thus there are total of 12 different combinations.

There are many combinations of operations that can be carried out. More specifically, in order to independently derive electrostatic images on two targets for reproduction and as the image signal, it is sufficient to adjust relative values of electrode potentials as described above.

The photoelectrons from the photoelectric surface are modulated by the U-target to reproduce the remote image on the fluorescent screen; the scanning electron current from the electron gun is modulated by the I target to obtain the image signal current of the image in the near station, as long as the photoelectric surface and the U target, and the cathode of the electron gun and I target are respectively maintained at the same potentials. This grid control of the electron current can be realized. By maintaining levels of these operating voltages of two sets at different values, for example $0 \sim 0 \pm \Sigma$, and $V \sim V \pm \Sigma$, substantially independent grid controls can be made. (However it should be understood that said levels of zero and V volts were selected only for the purpose of illustration and that generally $V_1$ and $V_2$ are used. In other words lower voltage is expressed by zero volt and the higher voltage by V volts. ($\Sigma$ represents a relatively low voltage.) Four ways of operating the tube are possible: thus either one of the two targets is utilized as the I target while the other target as the U target. In addition there are two additional variables, namely that the zero volt and V volts are impressed to either one of the set. In this way there are 48 combination which then result with regard to construction and method of operation. However, all of these combinations are not always satisfactory so that care should be taken in the method of operation. For example, it is preferable to operate the storage target which is facing to the electron gun as the I target.

By suitably combining these fundamental operations of the novel electronic device it is able to apply the tube for many applications. For example, FIG. 6 shows a schematic diagram of a slow speed scanning type video-telephone system employing the novel electron tubes and FIGS. 7 and 8 are charts to illustrate one operating program of the communication system. FIG. 6 shows a communication system of a video-telephone system between Mr. X and Miss Y utilizing one telephone line having a frequency bandwidth of several kolocycles.

In FIG. 6 Miss Y projects her own image on the photoelectric surface of an electron tube $Y_1$ through an optical system $Y_2$ and the image photoelectron current is stored on a storage target $Y_{8I}$ of the electron tube. The image signal produced by scanning the storage target by means of an electron beam is sent to Mr. X via an amplifier $Y_7$, a changeover switch $Y_5$ and the telephone line 3. On the other hand Mr. X receives Miss Y's image signal and applies it to the electron gun of an electron tube $X_1$ via a change-over switch $X_5$ and an amplifier $X_6$ to modulate the scanning beam thus writing the image of Miss Y on the storage target $X_{8U}$.

Mr. X and Miss Y effect alternately the above described steps to respectively store other party's image on the U target and its own image on the I target. In this way each party can either view other party's image while sending one's own image, or can reproduce other party's image for any desired time interval while stopping sending as well as receiving images. Since, during this interval the line is idle it can be used for talking.

FIG. 7 is a chart to explain a continuous communication system wherein one telephone line is utilized for the transmission of images, and the images of Mr. X and Miss Y are exchanged at a period of 5 seconds, for example. This chart also shows a case wherein an intermediate interval is provided during which Mr. X can check his own image, if desired. In this figure, portions on the opposite sides and shaded with horizontal lines indicate the periods during which the image of Mr. X is produced while those shaded with vertical lines the periods of reproducing the image of Miss Y. Reference letters ⓐ, ⓑ, ⓒ, ⓓ, ⓔ or [e] represent the type of aforementioned resolutions or their modifications. More particularly, for Mr. X's side, the reference letter ⓐ represents the erase and preparation of the U target, ⓑ the reception of Miss Y's image, ⓒ the erase and preparation of I target, ⓓ the writing on the I target and ⓔ the reproduction of Miss Y's image and the transmission of Mr. X's image. Also [e] represents the reproduction of Mr. X's image for monitoring and the transmission of his image. Similarly, for Miss Y's side, ⓐ represents the erase and preparation of the U target, ⓑ the reproduction of Mr. X's image, ⓒ the erase and preparation of the I target, ⓓ the writing on the I target and ⓔ the reproduction of Mr. X's image and the transmission of Miss Y's image.

FIG. 8 is a chart to explain a modified system wherein during the period of exchanging pictures, taking between parties is not possible and after other party's image has been stored in the tubes at the respective ends, talking is permitted through the idle line while viewing other party's image. In this case, the reference letters ⓐ, ⓑ, ⓒ, ⓓ, ⓔ, and [e] respectively represent the same operations as those in FIG. 7.

While in the arrangement shown in FIGS. 6, 7 and 8, the electron tubes embodying this invention are employed at both ends, the novel tube can be used in only one terminal station while the other terminal station can use an electron tube of another type provided that image sending speed, synchronizing system and other common items are designed to meet common requirements.

While the invention has been shown and described in terms of preferred embodiments thereof it should be understood by those skilled in the art that many changes and modifications may be made therein without departing from the true spirit and scope of the invention as defined in the appended claims.

What is claimed is:

1. An electron tube device comprising a photoelectric surface adapted to emit photoelectron current when irradiated by light,
- first and second mesh type storage targets which are parallel to each other and adapted to independently store electrostatic charge images, said first target being disposed opposite said photoelectric surface,
- an electron gun which emits an electron beam that can be modulated by an external image signal,
- a fluorescent screen which luminates upon impingement of electrons to display images,
- means to focus an optical image on said photoelectric surface so as to produce a photoelectron current to store an electrostatic charge image corresponding to said optical image on said first target.
- means to modulate the electron beam emitted from said electron gun by means of an external image signal to store an electrostatic charge image corresponding to said external image signal on said second target,
- means to display a luminous image corresponding to a selected one of said electrostatic images stored on said first and second targets, respectively, on said luminous screen, and means to scan the first target to produce an image signal corresponding to the electrostatic charge image stored thereon.

2. The electron tube device according to claim 1 wherein each of said mesh type storage targets comprises a back electrode consisting of a metal mesh and a charge storage layer of an electric insulator which is deposited upon one side of said back electrode.

3. The electron tube device according to claim 1 wherein each of said mesh type storage targets comprises a mesh of an electric insulator adapted to store charge, and a metal layer deposited on one side said electric insulator, said metal layer acting as the back electrode.

4. The electron tube device according to claim 1 wherein said two storage targets are disposed in parallel with a mesh electrode interposed therebetween.

5. The electron tube device according to claim 2 wherein the charge storage layers of said two storage targets are opposing each other.

6. The electron tube device according to claim 3 wherein the charge storage layers of said two storage targets are opposing each other.

7. The electron tube device according to claim 2 wherein the charge storage layer of one of the targets is facing to the back electrode of the other target.

8. The electron tube device according to claim 3 wherein the charge storage layer of one of the targets is facing to the back electrode of the other target.

9. The electron tube device according to claim 2 wherein the back electrodes of said two storage targets are opposing each other.

10. The electron tube device according to claim 3 wherein the back electrodes of said two storage targets are opposing each other.

No references cited.

RODNEY D. BENNETT, *Primary Examiner.*

J. P. MORRIS, *Assistant Examiner.*